US008537693B2

(12) United States Patent
Sundaresan et al.

(10) Patent No.: US 8,537,693 B2
(45) Date of Patent: Sep. 17, 2013

(54) MULTICAST SCHEDULING SYSTEMS AND METHODS FOR LEVERAGING COOPERATION GAINS IN RELAY NETWORKS

(75) Inventors: Karthikeyan Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 310 days.

(21) Appl. No.: 12/906,527

(22) Filed: Oct. 18, 2010

(65) Prior Publication Data

US 2011/0199913 A1 Aug. 18, 2011

Related U.S. Application Data

(60) Provisional application No. 61/305,212, filed on Feb. 17, 2010.

(51) Int. Cl.
*G01R 31/08* (2006.01)

(52) U.S. Cl.
USPC .......................................................... 370/243

(58) Field of Classification Search
USPC ................. 370/211, 243, 312, 315, 335, 336, 370/338, 375, 390, 395, 395.4
See application file for complete search history.

(56) References Cited

U.S. PATENT DOCUMENTS

| 2008/0274692 | A1* | 11/2008 | Larsson | 455/24 |
| 2009/0010164 | A1* | 1/2009 | Wang et al. | 370/235 |
| 2009/0073916 | A1* | 3/2009 | Zhang et al. | 370/315 |
| 2009/0116419 | A1* | 5/2009 | Chong et al. | 370/312 |

FOREIGN PATENT DOCUMENTS

EP 2031796 A1 * 3/2009

OTHER PUBLICATIONS

Alamouti, S. "A Simple Transmit Diversity Technique for Wireless Communications" IEEE Journal on Select Areas in Communications. vol. 16, No. 8. Oct. 1998. pp. 1451-1458.
Deb, S., et al. "Real-Time Video Multicast in WIMAX Networks" INFOCOM 2008. 27th IEEE International Conference on Computer Communications, Joint Conference of the IEEE Computer and Communications Societies. Apr. 2008. pp. 2252-2260.
Fleischer, L., et al. "Tight Approximation Algorithms for Maximum General Assignment Problems" Proceedings of the Seventeenth Annual ACM-SIAM Symposium on Discrete Algorithms, SODA Jan. 2006. (10 Pages).
IEEE Computer Society. "Part 16: Air Interface for Broadband Wireless Access Systems—Amendment 1: Multihop Relay Specification" IEEE Standard 802.16j. Jun. 2009. (314 Pages).
Nemhauser, G.L., et al. "An Analysis of Approximations for Maximizing Submodular Set Functions—I" Mathematical Programming Studies 14. 1978. pp. 265-294.
Sundaresan, K., et al. "On Coexistence of Unicast and Multicast Traffic in Relay-Enabled Wireles Networks" Proceedings of IEEE Broadnets. Sep. 2008. Pages 1-8.
Won, H., et al. "Multicast Scheduling in Cellular Data Networks" IEEE Transactions on Wireless Communications, vol. 8, No. 1. Jan. 2009. (9 Pages).

* cited by examiner

*Primary Examiner* — Jeffrey M Rutkowski
*Assistant Examiner* — Peter Mak
(74) *Attorney, Agent, or Firm* — Joseph Kolodka

(57) ABSTRACT

Methods and systems for transmitting multicast data in a wireless relay network are described. A tradeoff between the benefits of relay cooperation and session multiplexing can be addressed through careful association of relay stations for resource allocation purposes to maximize the total system throughput. In addition, various complex and greedy scheduling procedures that are based on the distributed pet mutation model and the contiguous permutation model are also described.

14 Claims, 8 Drawing Sheets

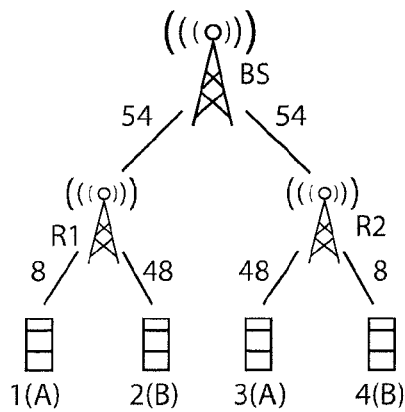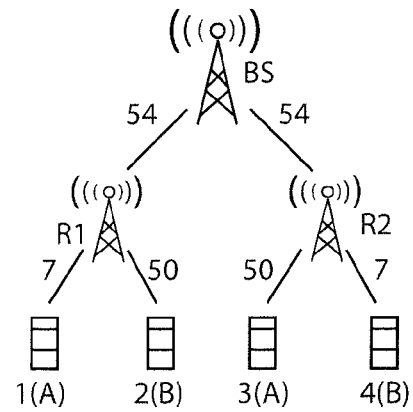
(A) No Reuse
FIG. 6A
(b) Corporation (1)
FIG. 6B
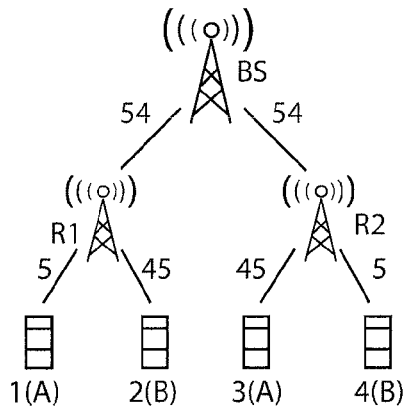
(c) Reuse (1)
FIG. 6C (d) Corporation (2)

(e) Reuse (2)

MULTICAST SCHEDULING SYSTEMS AND METHODS FOR LEVERAGING COOPERATION GAINS IN RELAY NETWORKS

RELATED APPLICATION INFORMATION

This application claims priority to provisional application Ser. No. 61/305,212 filed on Feb. 18, 2010, incorporated herein by reference.

BACKGROUND

1. Technical Field

The present invention relates to wireless communication networks and, more particularly, to multicast scheduling systems and methods in wireless relay networks.

2. Description of the Related Art

With the next generation wireless networks moving towards smaller (micro, pico) cells for providing higher data rates, there is a revived interest in multi-hop wireless networks from the perspective of integrating them with infrastructure cellular networks. With a decrease in cell size, relays can be employed to provide extended coverage. In this context, two-hop relay-enabled wireless networks have become a dominant, mandatory component in the fourth generation (4G) standards, such as Worldwide Interoperability for Microwave Access (WiMax) 802.16j and Third Generation Partnership Project (3GPP) Long Term Evolution-Advanced (LTE-adv), due to the plethora of potential applications they support. For example, such relay-enabled wireless networks can be implemented in or with hot-spots, office buildings, underground tunnel access, etc.

Orthogonal frequency division multiple access (OFDMA) has become the popular choice for air interface technology in 4G networks. In accordance with OFDMA, the entire spectrum is divided into multiple carriers (sub-channels), leading to several physical layer and scheduling benefits. Several works have investigated resource scheduling in wireless relay networks with regard to unicast applications.

SUMMARY

Existing scheduling solutions directed to multicast data have largely been restricted to one-hop cellular networks and cannot be carried over to relay networks. In contrast to existing works, exemplary embodiments of the present principles recognize a subtle tradeoff between advantages provided through relay cooperation and channel reuse. Further, embodiments carefully determine and delineate relay station associations for purposes of resource allocation in a way that balances the benefits of relay cooperation and channel reuse to improve overall throughput of multicasts in wireless relay networks.

One embodiment is directed to a method for transmitting multicast data on a wireless relay network. Here, relay stations can be associated into different subsets. Relay stations within a subset can employ a cooperation mechanism to transmit multicast data on common transmission resources and can employ a resource reuse mechanism to transmit the multicast data independently with respect to relay stations in other subsets. A schedule for allocation of transmission resources to each subset can be determined to implement the cooperation and resource reuse mechanisms. Moreover, the multicast data can be transmitted to users in accordance with the schedule.

Another embodiment is directed to a wireless relay network system. The system can include a set of relay stations that are associated into different subsets. Relay stations within a subset can employ a cooperation mechanism to transmit multicast data on common transmission resources and can employ a resource reuse mechanism to transmit the multicast data independently with respect to relay stations in other subsets. The system may further include a base station that is configured to determine a schedule to allocate transmission resources to each subset and thereby implement the cooperation and resource reuse mechanisms. Additionally, the relay stations can be configured to relay multicast data for transmission to a plurality of users in accordance with the schedule.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIGS. 6A-6E are diagrams detailing the performance of a variety of multicast strategies for a wireless relay network.

DETAILED DESCRIPTION OF PREFERRED EMBODIMENTS

Figure 1:
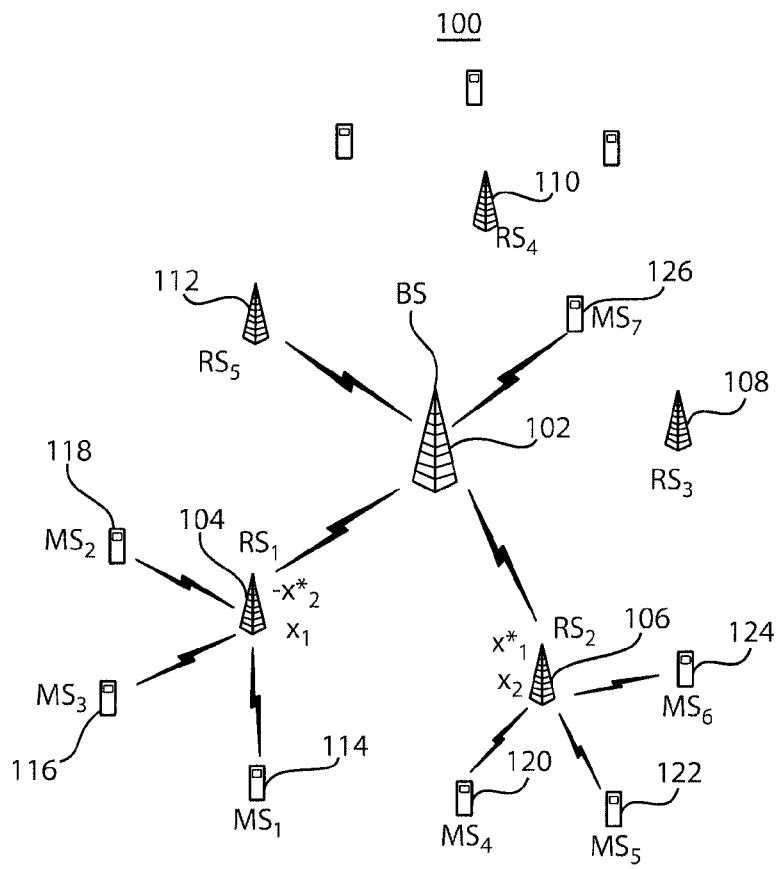
FIG. 1 is a block diagram of a wireless relay network.

Prior to discussing exemplary embodiments in detail, it should be noted that the two-hop network model coupled with OFDMA provides several diversity gains that can be leveraged through intelligent scheduling, including multi-user diversity, channel diversity and cooperative diversity. For example, with regard to multi-user diversity, for a given sub-channel, different users experience different fading statistics, permitting the selection of a user with a larger gain for allocation of the given sub-channel. Furthermore, channel diversity can also be exploited. For example, sub-channels experiencing high gain could vary from one user to another, permitting for multiple users to be assigned their best channels in tandem. With respect to cooperative diversity, relays can exploit wireless broadcast advantage to cooperate and improve the signal-noise ratio (SNR) at the intended receiver.

As indicated above, several scheduling works have focused on unicast applications of wireless relay networks. In contrast, exemplary embodiments of the present principles are directed to efficient scheduling methods and systems for multicast traffic in two-hop OFDMA relay networks. Multicasting in two-hop relay networks is significantly different from the conventional cellular multicast. For example, the broadcast advantage of multicast data is substantially diminished on the access hop, between a relay station (RS) and a mobile station (MS), where scheduling effectively can become equivalent to multiple unicast transmissions from the different RS, thereby employing more transmission resources. Relay cooperation permits multiple RS to simultaneously transmit the multicast data on the same transmission resource through appropriate cooperation mechanisms. Hence, it can provide an effective means to retain the broadcast nature of the traffic on the access hop, making it an important component in improving multicast performance in accordance with exemplary aspects. However, it can be shown that relay cooperation is not always beneficial. In particular, as discussed further herein below, it can be shown that there exists a subtle tradeoff between cooperation gains and the ability to multiplex multicast sessions effectively, both of which are important for maximizing the aggregate multicast system performance. Exemplary embodiments described herein below utilize novel strategies that carefully select the relays for cooperation to effectively address this tradeoff.

Two models for grouping sub-carriers to form a sub-channel are employed: distributed permutation (DP) and contiguous permutation (CP). Having identified the multicasting strategy, as described further herein below, the multicast scheduling problem can be solved under both of these models. Here, the allocation of sub-channels to multicast sessions on both the relay and access hops are determined in accordance with the multicast strategy so as to maximize the aggregate multicast system performance. Efficient methods with approximation guarantees for both models are described herein below.

In particular, as stated above, exemplary embodiments address the tradeoff between cooperation gains and effective multiplexing of multicast sessions through intelligent selection of relays for cooperation. Moreover, a linear programming (LP)-based $$\left(1 - \frac{k}{N}\right)$$

approximation method for the DP model is provided, where k∈[2,R+1] and N and R are the number of channels and relays, respectively. An efficient, faster greedy method that performs very close to the LP-based method on average is also described. In addition, a $$\left(1 - \frac{1}{e} - \varepsilon\right)^k$$

approximation method for the more difficult CP model is further discussed, where k∈[2,R+1].

System Description

A. Network Model

With reference to FIG. 1, a downlink OFDMA-based, relay-enabled, two-hop wireless network 100 is considered. A set of K mobile stations (MS) MS-1 to MS-7, 114-126, respectively, are uniformly located within an extended cell radius. A small set of R relay stations (RS) $RS_1$-$RS_5$, 104-112, respectively, are added to the mid-way belt of the network. MS that are closer to the BS directly communicate with it. However, MS farther from the BS connect with the RS that is closest to them. The one-hop links between BS and RS are referred to herein as "relay links." In turn, one-hop links between the RS and MS are referred to herein as "access links," and the one-hop links between the BS and MS are referred to herein as "direct links."

Data flows are considered and assumed in this example to originate in the Internet and destined towards the MS. All stations are assumed in this example to be half-duplex. Hence, in this exemplary embodiment, an RS can be active on only its relay or access link in any slot but not both. Let $P_B$, $P_R$ denote the maximum power used by the BS, RS, respectively, for their transmission ($P_R \leq P_B$), which is split equally across all sub-channels and no power adaptation across channels is assumed, given the likely marginal gains resulting from it. The BS, RS and MS are permitted to operate on multiple channels from a set of N total OFDM sub-channels. As stated above, two models for grouping of subcarriers to form a subchannel are considered: distributed permutation (DP) and contiguous permutation (CP). As the name suggests, the sub-carriers constituting a sub-channel are chosen randomly from the entire frequency spectrum in DP, while adjacent sub-carriers are chosen in CP. In DP, a single channel quality value (averaged over the entire spectrum) is fed back by a RS/MS, which is common to all its sub-channels. While the random choice of sub-carriers in a channel eliminates channel diversity, the random selection of sub-carries helps average out interference. In CP, the high correlation in channel gains across adjacent sub-carriers helps leverage channel diversity through scheduling. However, a RS/MS may have to feed back channel quality on all its sub-channels to the BS.

B. Potential Gains

Figure 2:
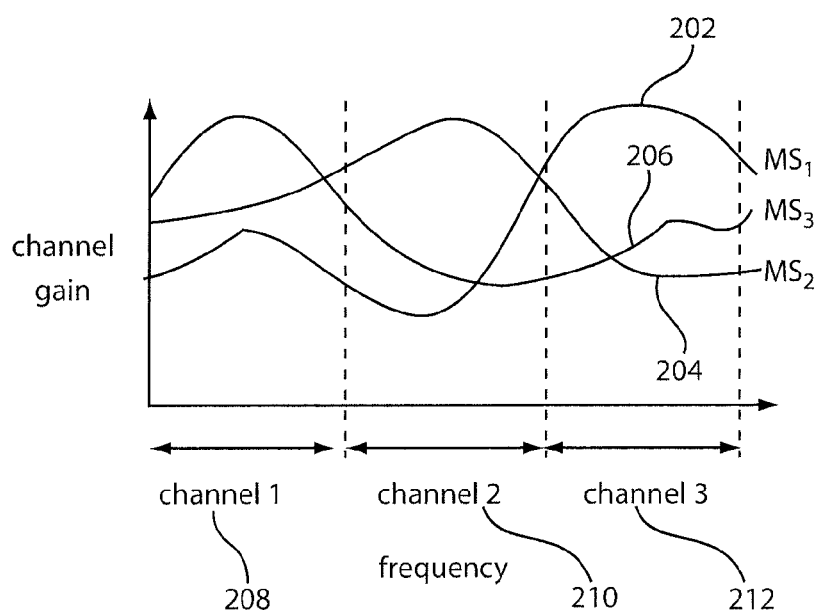
FIG. 2 is a graph illustrating a typical example of channel gains on channels for mobile stations served in a wireless relay network.

As discussed above, relay networks can provide three forms of diversity gains. For example, referring to FIG. 2 with continuing reference to FIG. 1, a graph 200 illustrating the frequency response of three channels for three MS 114-118 correlated to plots 202-206, respectively, is provided. Multipath fading and user mobility result in independent fading across users for a given channel, contributing to multi-user diversity. Further, the presence of multiple channels and the corresponding frequency selective fading results in different channels experiencing different gains for a given MS, contributing to channel diversity. These gains make it possible to schedule multiple users in tandem, while providing good quality channels to many of them. For example, channel 3 (212) can be allocated to $MS_1$ (114), channel 2 (210) can be allocated to $MS_2$ (116) and channel 3 (212) can be allocated to $MS_3$ (118).

For illustrative purposes, it can be assumed that a data symbol x from a single multicast session is to be transmitted to subscribed clients $MS_1$ (114) and $MS_4$ (120) through $RS_1$ (104) and $RS_2$ (106), respectively. The wireless broadcast advantage (WBA) permits the BS (102) to transfer x to both of the RS 104, 106 using a single channel resource on the relay hop. However, because the RS transmissions are independent, the transfer from the RS effectively can entail the use of two channel resources on the access hop, although the data is the same. Hence, relay cooperation strategies can be employed to retain the WBA on the access hop. In accordance with one exemplary aspect, the simple yet effective, Alamouti space-time code can be used in a distributed manner to enable relay cooperation. No information exchange across relays is required. Of the two codewords ($\{x_1, -x_2^*\}$, $\{x_2, x_1^*\}$) used by the scheme over two time slots, the odd-numbered relays can transmit the first codeword, while the even-numbered relays can transmit the second codeword during cooperation as illustrated below in Table 1. This procedure can entail the use of a single channel resource per data symbol and can increase the received SNR at the MS, which is a gain referred to as "cooperative diversity."

TABLE 1

Multi-user Channel Diversity

|   | $RS_{2K}$ | $RS_{2K+1}$ |
|---|---|---|
| t | $x_1$ | $x_2$ |
| t + 1 | $-x_2^*$ | $x_1^*$ |

C. Scheduling Model

With regard to frame structure, a synchronized, time-slotted system similar to WiMAX and LTE is considered, with BS and RS transmitting data in frames. Every frame comprises several time slots and is populated with user assignments across channels for LTE, where there is no channel sharing across slots. For WiMAX, user assignments across both time slots and channels can be made. To address both models, it is sufficient to consider the problem with one time slot per frame (LTE), as channels in other time slots can be considered as additional channels available to the considered time slot (WiMAX).

For multicast scheduling, assignments can be made with respect to sessions, where multiple MS and corresponding RS can be subscribed to a session. Multicast sessions with backlogged buffers are also considered, with extensions to finite buffers described further below. Time-divisioned scheduling of the relay and access hops, where the relay hop is followed by the access hop, is adopted as advocated in the Institute of Electrical and Electronics Engineers (IEEE) multihop relay standard, P802.16j. The session assignments to relay hop channels for the current frame and the session assignments to access hop channels for the following frame can be indicated to RS and MS through a MAP that follows the preamble in the frame (e.g., 802.16j), which is transmitted at the lowest modulation and coding. In every slot of a frame, a set of RS (MS) on the relay (access) hop is activated based on the assignments provided by the BS.

An objective of exemplary scheduling schemes described herein is to maximize the end-to-end multicast system throughput subject to the popular proportional fairness model. The considered system can be shown to converge to the optimum if the scheduler's decisions at each epoch (interval) are made to maximize the aggregate marginal (incremental) utility, $T_{max}=\arg\max_T \{\Sigma_{s \in T} \Delta U_s\}$. $\Delta U_s$ denotes the marginal flow (two-hop) utility received by session s in a feasible schedule T and is given by $$\frac{\beta_s r_s^{eff}}{\tilde{r}_s}$$

for proportional fairness, where $\beta_s$ captures the priority weight of a session's QoS class and $\tilde{r}$ its average throughput.

$r_s^{eff}$ corresponds to the session's two-hop flow rate, which in turn is determined by the instantaneous effective rate on the relay and access hops combined. Let $r_s^{rel}$ and $r_s^{acc}$ be the net bit-rates obtained for a session s on the relay and access hops respectively. Then, $$r_s^{eff} = \frac{\min\{r_s^{rel}, r_s^{acc}\}}{2}.$$

Reliable multicast sessions are considered and hence the transmission rate for a session on a hop is assumed to be given by the minimum rate of its subscribed relays/users on the relay/access hop, respectively. If K, R, S denote the set of MS, RS, and sessions respectively, then $r_s^{rel}=\min_{j \in R} \{r_{s,j}^{rel}\}$ and $r_s^{acc}=\min_{j \in R} \{r_{s,j}^{acc}\}$. Let $A_{s,j}^{rel}$ and $A_{s,j}^{acc}$ denote the set of channels assigned to relay j for session s on the relay and access hops respectively. Then $$r_{s,j}^{rel} = \sum_{i \in A_{s,j}^{rel}} r_{s,j,i}^{rel}$$

and $$r_{s,j}^{acc} = \sum_{i \in A_{s,j}^{acc}} r_{s,j,i}^{acc}$$

where $r_{s,j,i}^{rel}$ and $r_{s,j,i}^{acc}$ indicate relay and access hop rates of session s at relay j on channel i respectively. Because there could be multiple MS subscribed to the same session at a relay, $r_{s,j}^{acc}=\min_{k \in K: R(k)=j} \{r_{s,j,i}^{acc}\}$.

At an epoch t, $$w_s(t) = \frac{\beta_s}{2\tilde{r}_s(t)}.$$

The scheduling problem then reduces to determining the schedule that maximizes the following weighted sum rate.

$$T_{max} = \arg\max_T \left\{\sum_{s \in T} w_s(t) \min\{r_s^{rel}, r_s^{acc}\}\right\} \quad (1)$$

Figure 3:
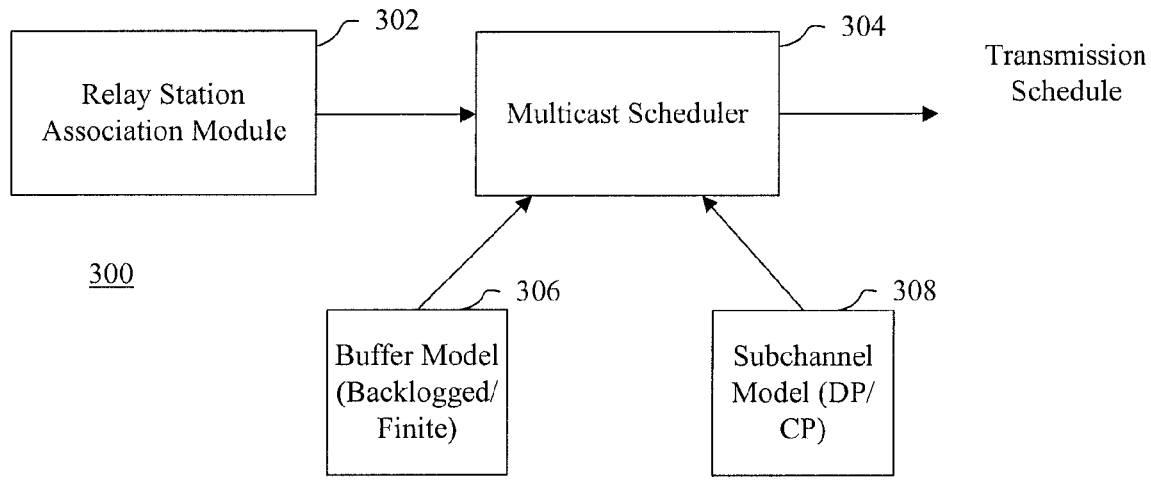
FIG. 3 is a block/flow diagram of a base station system.
Figure 4:
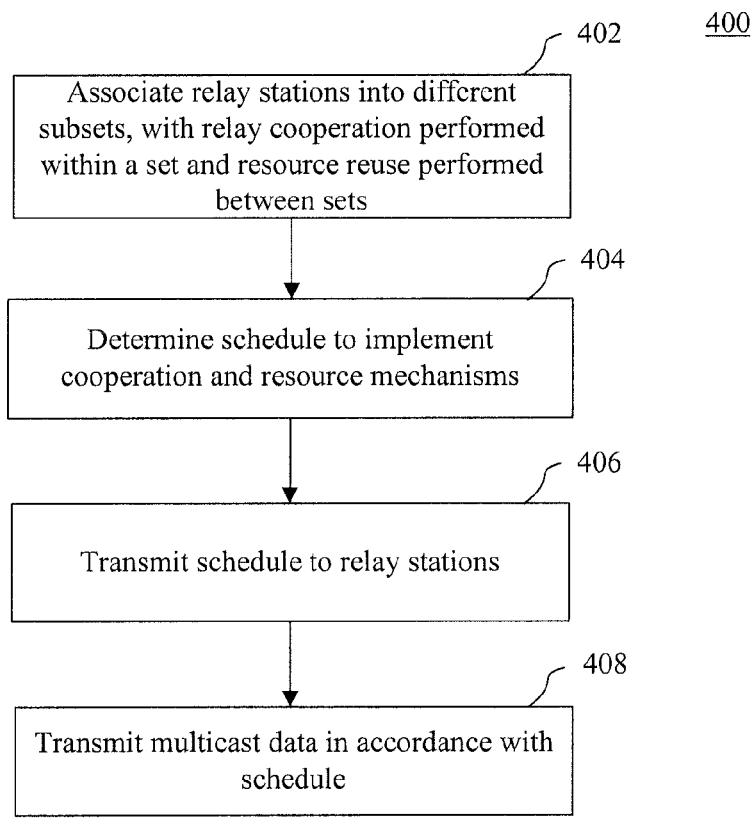
FIG. 4 is a block/flow diagram of a method for transmitting multicast data on a wireless relay network.

Referring now to FIGS. 3 and 4, with continuing reference to FIG. 1, a system 300 for implementing various scheduling methods described herein below is illustrated. For example, the system 300 can be configured to perform a method 400 for transmitting multicast data on a wireless relay network, as depicted in FIG. 4. Further, the system 300 can be implemented at a base station 102. The system 300 can include a relay station association module 302 and a multicast scheduler 304, which can employ a buffer model 306 and a sub-channel model 308. Elements of the system 300 are described in more detail below with respect to specific method embodiments.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The method 400 can begin at step 402, in which the association module 302 can associate relay stations into different subsets. Here, relay stations within a subset can employ a cooperation mechanism to transmit multicast data on common transmission resources. In addition, the relay stations may also employ a resource reuse mechanism to transmit the multicast data independently with respect to relay stations in other subsets. The association module can base the association on information received from the RS and/or MS. For example, as discussed further herein below, the association can be dependent on interference measures determined at mobile stations due to signals received from relay stations servicing other users.

At step 404, the multicast scheduler 304 can determine a schedule to allocate transmission resources to each subset and thereby implement the cooperation and resource reuse mechanisms. For example, as discussed further herein below, the multicast scheduler 304 can construct the schedule by employing a distributed permutation model or a continuous permutation model or by employing greedy procedures.

At step 406, the multicast scheduler 304 can direct the transmission of the schedule to the relay stations 104-112. In turn, at step 408, the relay stations may transmit multicast data received from the base station 102 in accordance with the schedule. As discussed herein below, methods employed herein recognize a tradeoff between advantages provided through relay cooperation and session multiplexing. The careful selection of subsets of relay stations to generate the schedule balances the tradeoff and thereby maximizes the overall throughput of the system.

Strategies for Multicasting

Figure 5A:
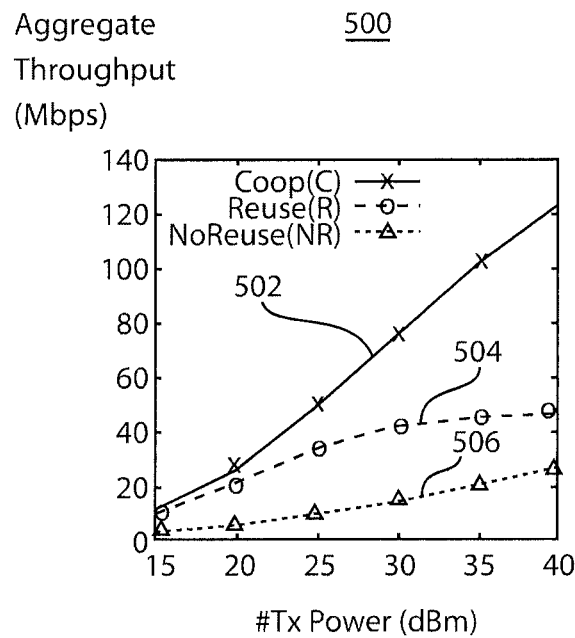
FIGS. 5A-5B are graphs illustrating the aggregate throughput at various transmission powers in a wireless relay network in accordance with a plurality of different scheduling schemes.
Figure 5B:
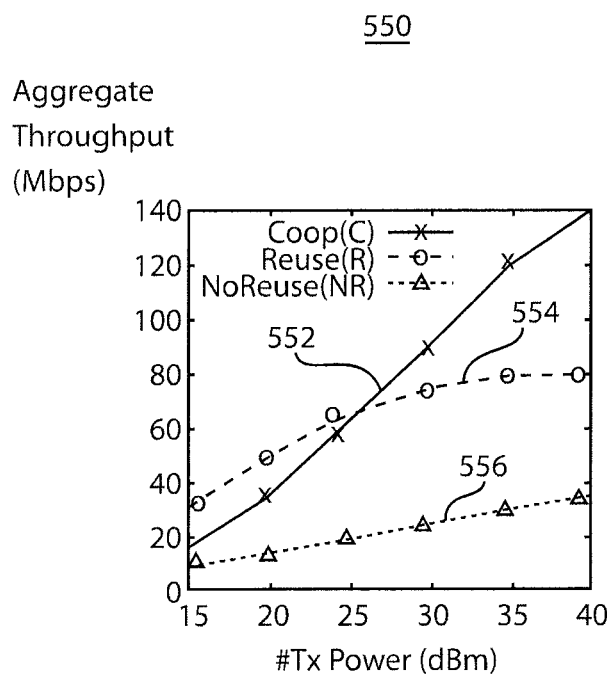

The ability to use the broadcast nature of the wireless medium to transfer a common, shared data to multiple users using a single transmission resource (frequency and time) is referred to as the broadcast advantage (BA). While BA is available on the relay hop (BS-RS) for multicast transmissions, it is significantly diminished on the access hop (RS-MS), where the multicast data effectively becomes unicast data across multiple RS, thereby restricting BA to only within each RS. This is turn makes relay cooperation an important component to improve multicast performance, whereby it permits multiple RS to simultaneously transmit the multicast data on the same transmission resource through appropriate cooperation mechanisms to retain BA on the access hop as well. The benefits of relay cooperation are evident from FIGS. 5A and 5B, illustrating graphs 500 and 550, respectively, where the performance of a typical multicast system is evaluated. The exemplary multicast system evaluated to construct graphs 500 and 550 employs 20 channels for 10 sessions with 6 relay stations. The graphs 500 and 550 plots aggregate throughput in Mbps versus transmission power in dBm of the relay stations for six active relay stations (500) and three alternate active relay stations (550), respectively.

A. Cooperation v. Statistical Multiplexing

Figure 6D:
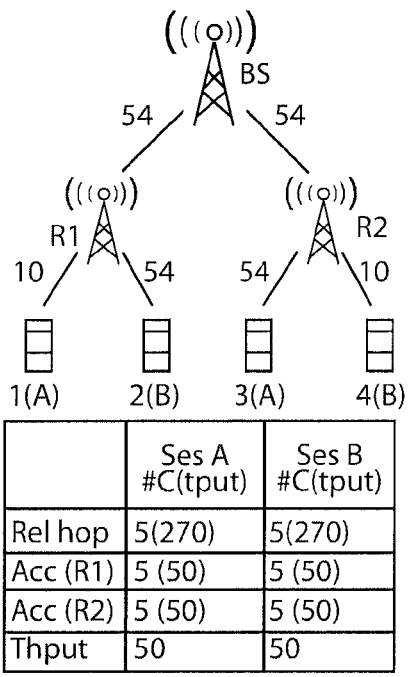

As indicated above, exemplary methods employed herein recognize that relay cooperation is not always beneficial. For example, there exists a subtle tradeoff between cooperation gains and the ability to multiplex multicast sessions effectively, both of which are important for maximizing the aggregate multicast system performance. FIGS. 6A-6E illustrate evaluations for a wireless relay network with 10 channels for servicing two sessions on each hop. Users 1,3 belong to session a, while users 2,4 belong to session b. The DP model is considered, where the rates do not vary across channels and are indicated in FIG. 6A. The access hop forms the bottleneck and determines performance in this example.

In the basic strategy of no reuse (NR) corresponding to FIG. 6A, multicast data becomes unicast on the access hop, wherein the available channels are shared both across relays and across sessions within a relay. This results in a net throughput of, for example, 48 Mbps with an allocation indicated in FIG. 6A. When relay cooperation (C) is leveraged, as shown in FIG. 6B, simultaneous cooperative transmission from both of the relays increases the rate on the access hop from, for example, 6 to 7 Mbps, and 48 to 50 Mbps. Although the transmissions across relays occur on the same channel, carrying the same data for a given session, there will be mutual interference if the transmissions occur at different rates. Hence, to avoid interference, the cooperative transmissions are set to the same rate, namely that of the bottleneck user (7 Mbps) in the session. This results in a net throughput of 70 Mbps, which is a significant gain over the baseline and the corresponding allocation is indicated in FIG. 6B.

Figure 6E:
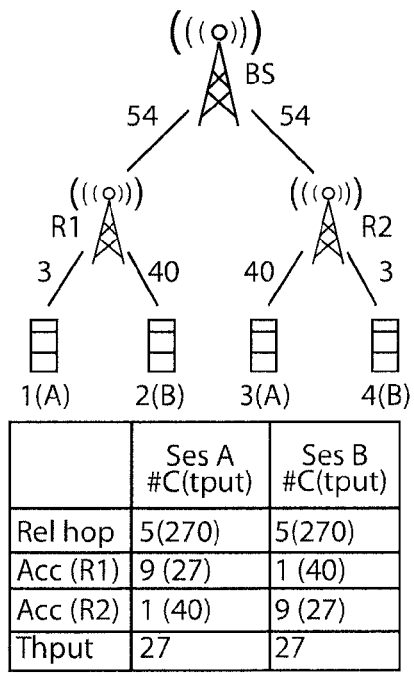

FIG. 6C illustrates the performance of an alternate strategy, reuse (R), where the available channels on the access hop are reused at each relay. However, instead of coupling themselves through cooperative transmissions (at bottleneck rate) for a given session, the relays operate independently at their respective rates subject to the resulting interference that arises. The resulting reduced rates on the access hop in the presence of interference, for example, 6 to 5 Mbps and 48 to 45 Mbps, are indicated in FIG. 6C. Decoupling the relays' transmission permits the allocation of a varying number of channels across relays for the same session, thereby enabling efficient leveraging of the high rates experienced by the session at different relays. Along with an intelligent channel allocation and statistical multiplexing across sessions, a higher aggregate multicast flow can be achieved. As indicated in FIG. 6C, such an allocation results in a net throughput of 90 Mbps, which is a gain of about 30% over relay cooperation. This type of gain is referred to herein as the session multiplexing gain. It should be noted that, this statistical multiplexing gain comes at the cost of cooperation gain and interference. Hence, scenarios where users are closer to their associated RS than to the interfering RS are appropriate for leveraging multiplexing gain. Here, the loss due to interference and, consequently, also the gain from cooperation will be low. On the other hand, when interference is high, the benefits from cooperation outweigh statistical multiplexing gains. This is evident from the alternate example in FIGS. 6D and 6E, illustrating the use of cooperation and reuse, respectively, in a high interference scenario. Here, cooperation provides a net throughput of 100 Mbps, which is almost a 100% gain over the 54 Mbps throughput delivered by channel reuse.

To further illustrate this tradeoff, a larger, network-level setting is considered. In the system evaluated by the plot 500 of FIG. 5A, the users are uniformly distributed, resulting in an interference power that is comparable to signal power for users on the boundaries between neighboring relays. This scenario provides larger gains from cooperation, especially with increasing transmit power, as illustrated by comparing plot 502 in which a cooperation scheme is employed with plots 504 and 506, in which reuse and no reuse schemes are employed, respectively. However, in reality, user distribution may be clustered in hot spots, resulting in a relay deployment where some relays are farther compared to others. As a result, users associated with certain relays receive a much lower interference power compared to signal power. Such a scenario is emulated by switching off alternate relays and their associated users for the same topology. The corresponding evaluation result is provided in FIG. 5B, which reveals the interesting tradeoff. As illustrated in FIG. 5B, with plots 552, 554 and 556 corresponding to utilization of a cooperation scheme, a reuse scheme and a no reuse scheme, respectively, at low-moderate transmit powers, due to lower interference and hence lower cooperation gain compared to existing signal power, the potential for leveraging session multiplexing gain by reusing channels across relays (R) is much higher, resulting in a gain of 50% over cooperation. However, at large transmit powers, the influence of interference and, hence, higher cooperation gain starts to dominate.

As such, given a transmit power, every relay, or a base station on behalf of the relays, should determine if the rate loss due to interference warrants translating it to a rate gain through cooperation (C) or warrants sustaining the interference to leverage session multiplexing gain through channel reuse (R).

B. Determining Cooperation Relays and Components

To strike a good balance between cooperation and multiplexing, an intelligent combination of cooperation and reuse strategies should be employed. To implement such a combination, referring again to FIG. 4, the set of active relays can be partitioned into subsets at the association step 402 such that: (i) there is negligible interference across relay subsets that promotes better session multiplexing through channel reuse across subsets; (ii) there is appreciable interference within subsets that advocates cooperation between the member relays serving the same session and channel sharing across sessions. A relay is defined to be active if it serves at least one user subscribed to a multicast session. While relays with no subscribed clients can aid the transmissions in neighboring relays by participating in cooperation, their utility will be low as they have no client of their own to serve. Further, by participating in cooperation, they can also reduce the gain from statistical multiplexing of sessions. This, coupled with the ability to operate the inactive relays in idle-mode for energy saving, prompts consideration of only active relays in the schedule. However, the methods disclosed herein can be easily adapted to incorporate inactive relays as well.

Figure 7:
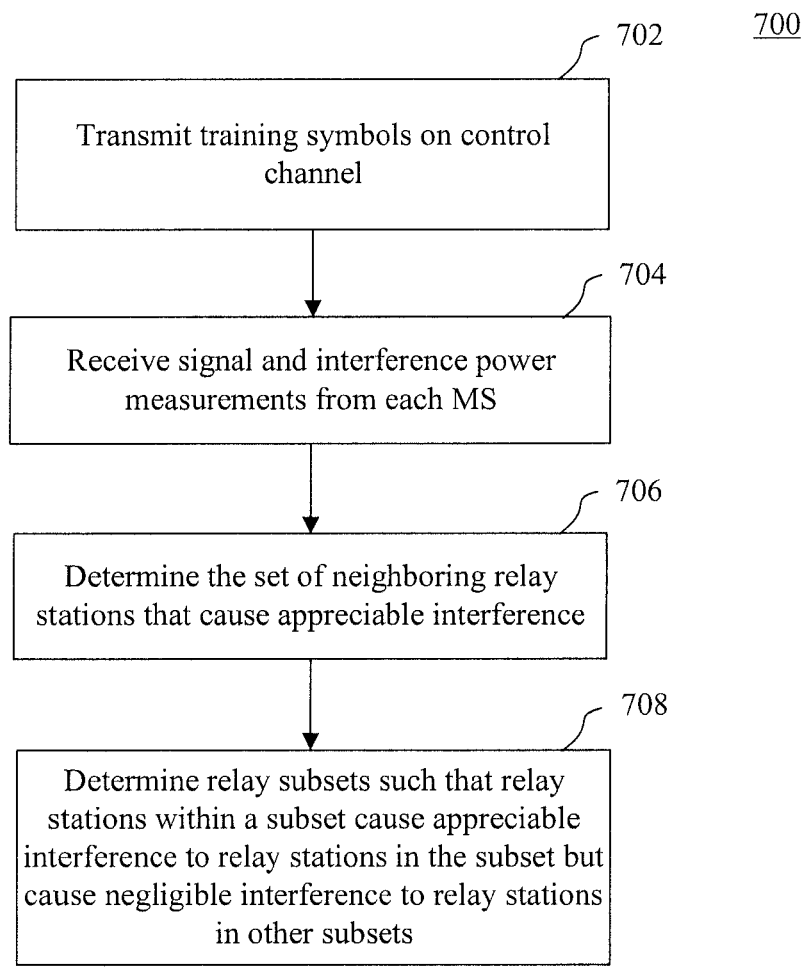
FIG. 7 is a block/flow diagram of a method for associating relay stations that balances a tradeoff between benefits associated with relay cooperation and channel reuse schemes.

With reference to FIG. 7, with continuing reference to FIGS. 1, 3 and 4, an exemplary method 700 for associating relay stations that can be implemented at step 402 to balance the tradeoff between gains provided by cooperation and reuse strategies is illustrated. It should be noted that measurement and reporting functionalities provided in the relay standard can aid in an implementation of method 700.

The method 700 can begin at step 702, in which active relay stations can transmit training signals on a controller channel. For example, the base station 102 can instruct each active RS, $RS_1$ 104, $RS_2$ 106 and $RS_4$ 108, to transmit training symbols on a control channel in isolation. In turn, all MS can measure the corresponding signal power (from its serving RS) and the corresponding interference power (from other RS).

Thus, at step 704, each active relay station can receive the corresponding signal and interference power measurements from each of the MS it serves.

At step 706, each active relay station can determine the set of neighboring RS that cause appreciable interference to MS it services. Here, each relay station can transmit the set of neighboring RS causing appreciable interference to the base station 102 for its evaluation by the relay station association module 302. Alternatively, each active relay station can transmit to the base station 102 the power measurements received from their corresponding MS. In turn, the relay station association module 302 can determine, for each relay station, the set of neighboring RS that cause appreciable interference. In either case, according to one exemplary aspect, a neighboring RS causes appreciable interference to a given RS when a particular number or proportion of MS served by the given RS receive interference from the neighboring RS that exceeds an interference threshold.

At step 708, the relay station association module 302 can determine relay subsets such that relay stations within a subset cause appreciable interference to relay stations in the subset but cause negligible interference to relay stations in other subsets. The relay station association module 302 can delineate the relay subsets by representing the RS as vertices of a graph, with edges between vertices indicating the presence of appreciable interference between corresponding relays. Each disjoint component of the graph can define and correspond to a different subset. For example, the number of disjoint connected components in this graph, which is two components in the example provided in FIG. 1, gives the number of relay subsets ($\{RS_1, RS_2\}, \{RS_4\}$) that cause negligible interference to each other.

As indicated above, the relay stations within a subset can employ a cooperation mechanism to transmit multicast data on common transmission resources and can employ a resource reuse mechanism to transmit the multicast data independently with respect to relay stations in other subsets. For example, the RS inside each connected component (subset) can use the distributed Alamouti code to participate in cooperation with other RS inside the same subset. This in turn translates the interference inside the subset into a cooperation gain. However, as discussed above, when this cooperation is extended across subsets, it only brings marginal cooperation gains (due to low signal power across subsets). More importantly, in exemplary embodiments, the cooperation couples the transmissions of a session across subsets to happen at the same rate, thereby eliminating the potential for statistical multiplexing of sessions. Hence, one joint multicast strategy (RC) in accordance with an exemplary embodiment (i) uses the method 400 to first determine the relay subsets; (ii) enables cooperation between relays ($RS_1$, $RS_2$) serving the same session within each subset to eliminate interference; and (iii) reuses channels across subsets on the access hop without any coupling or cooperation to leverage statistical multiplexing of sessions. It should be noted that RC has a bias towards cooperation, as it leverages cooperation gain in the presence of appreciable interference and leverages multiplexing gain only when the gains from cooperation are marginal at low interference. This is because, while cooperation gain can be directly leveraged, multiplexing gain depends on the distribution of session rates across relays to deliver benefits. It should be noted that cooperation (C) and reuse (R) strategies are obtained as a special case of RC: one subset with all R relays and R subsets with one relay each, respectively.

C. Problem Formulation

Having identified a joint multicast strategy, the objective provided above in equation 1 can be made more specific as follows.

$$T_{max} = \underset{T}{\operatorname{argmax}} \left\{ \sum_{s \in T} w_s(t) \min\{r_s^{rel}, r_s^{acc}(1), \ldots, r_s^{acc}(C)\} \right\} \quad (2)$$

where C is the total number of relay subsets (components) on the access hop. The relay hop contributes an additional component (subset), with the difference being that all active relays are part of this component and no cooperation is employed. Hence, the core scheduling problem can now reduce to determining an allocation of N channels to K sessions on each of the C+1 components, such that the weighted sum of the minimum (across components) session rates is maximized. This scheduling problem is addressed under the DP and CP models herein below.

Multicast Scheduling Under DP

Under the distributed permutation model, all channels of a session experience the same rate in a component (due to cooperation), but can vary across components. The scheduling problem can be formulated as the following integer program (MDP):

$$MDP: \text{Maximize} \sum_{k=1}^{K} A_k$$

subject to, $F_{k,c} X_{k,c} \geq A_k$, $\forall k, c$ $$\sum_k X_{k,c} \leq N, \forall c;$$

where, $F_{k,c} = w_k r_k(c)$;

$X_{k,c} \in \{0, 1, \ldots, N\}$.

Here, N is the total number of channels; $X_{k,c}$ denotes the number of channels allocated to session k in component (subset) c; $F_{k,c}$ is the weighted flow for session k in component c and depends on the weight for the session $w_k$ and its rate $r_k(c)$ in component c.

The goal of MDP is to maximize the aggregate flow that can be delivered to multicast sessions. The first constraint indicates that the flow received by a session is restricted to the minimum across components. Further, while multiple channels can be assigned to a session, the total across sessions is restricted to N in each component (second constraint). The session's weight ($w_k$), if any, is folded into its modified rate in each component ($F_{k,c}$ in the last constraint), where $r_k(c)$ is the effective rate of the session in component c that takes into account cooperation and interference. It can be shown that MDP is non-deterministic polynomial-time hard (NP-hard):

Theorem 1:

MDP is NP-hard even for 2 components (2MDP).

The proof is omitted here for brevity purposes. Although hard, it can be shown that 2MDP potentially belongs to the class of easier hard problems. However, more components (>2) and the introduction of contiguous permutation, with varying rates across channels for a session, make the problem significantly harder.

A. LP-Based Method

Figure 8:
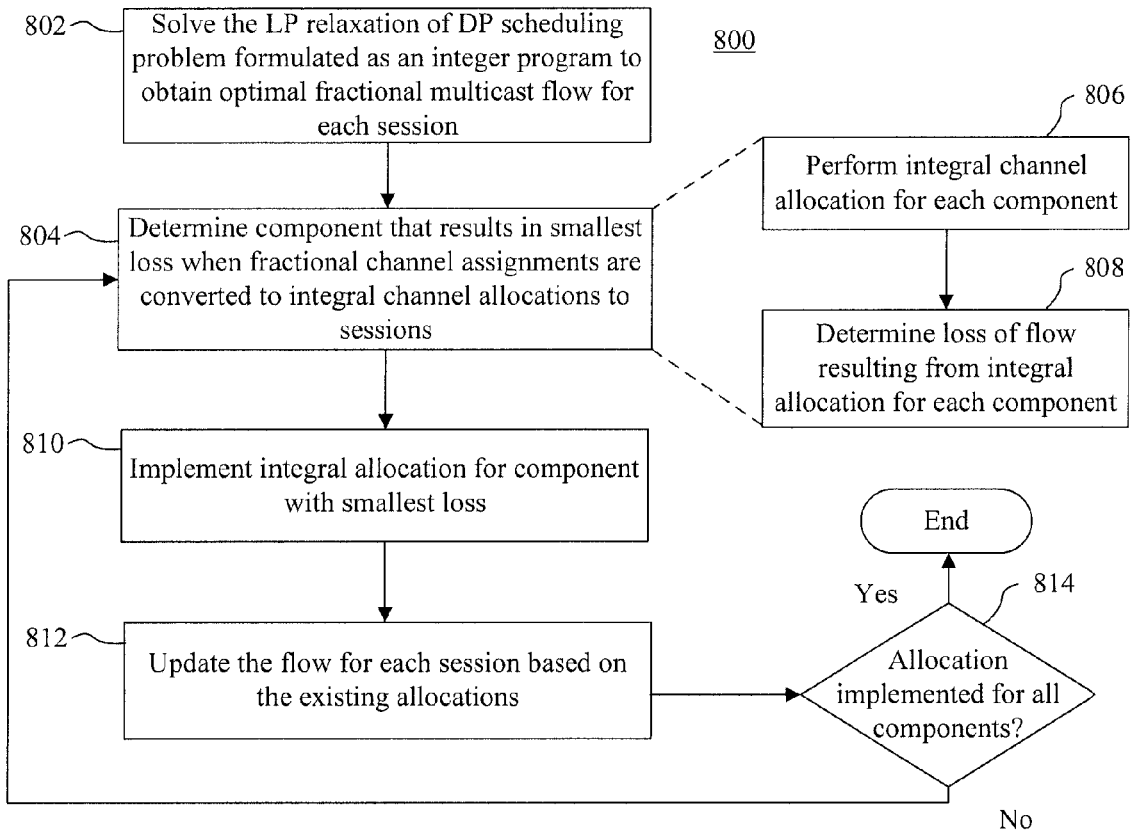
FIG. 8 is a block/flow diagram of a scheduling method based on a distributed permutation model.

With reference now to FIG. 8 with continuing reference to FIGS. 3 and 4, a method 800 for determining a multicast schedule in accordance with an exemplary embodiment of the present invention is illustrated. It should be noted that the method 800 can be performed to implement step 404 of the method 400. In addition, it should also be noted that Algorithm 1 in Table 2 can be performed to implement the method 800. Algorithm 1 is an LP-based algorithm (MSDP) that can be utilized to solve MDP.

TABLE 2

Algorithm 1 Multicast Scheduler under DP: MSDP

1: Solve the LP relaxation of MDP with solution $X_{k,c}*$ and $A_k*$.
2: C = {1,...,C}
3:
4: while C ≠ 0 do
5:   Determine the loss due to integrality restoration in each component.
6:   for c ∈ C do
7:     $Z_{k,c} = 0$, $\forall k$, i and $B_k = A_k*$, $\forall k$.
8:     for i ∈ [1,N] do
9:       $Z_{k',c} = Z_{k',c} + 1$, where k' = arg $\max_k \{\min\{F_{k,c}, B_k\}\}$
10:      $B_{k'} = B_{k'} - \min\{F_{k',c}, B_{k'}\}$
11:    end for
12:    $L_c = \Sigma_k \{A_k* - Z_{k,c}\} \cdot F_{k,c}$
13:  end for
14:  Perform integral allocation for component with smallest loss
15:  c' = arg $\min_{c \in C} L_c$
16:  Update $\hat{X}_{k,c'} \leftarrow Z_{k,c'}$, $\forall k$
17:  Update $A_k* = \min\{A_k*, F_{k,c'} \cdot \hat{X}_{k,c'}\}$, C ← C \ c'
18: end while The method 800 can begin at step 802, in which the multicast scheduler 304 can solve the LP relaxation of MDP as illustrated in step 1 of Algorithm 1, with $X_{k,c} \in [0, N]$. Let the solution of the LP relaxation be $X_{k,c}*$ and and $A_k*$ with the net optimal flow being $\Sigma_k A_k*$. $X_{k,c}*$ gives the net fractional channel allocation to session k on component c, with $\Sigma_k X_{k,c}* \leq N$. Here, some of the channels may be fractionally shared between sessions in each component, whose integrality should be restored for a feasible schedule. It should be noted that "fractional" channel allocation, as employed herein, should be understood to mean channel allocation in which channels can be fractionally allocated but may include integral channel allocation as well.

At step 804, the multicast scheduler 304 can determine the component that results in smallest loss when fractional channel assignments are converted to integral channel allocations to sessions. Here, for each component c, the multicast scheduler 304 can determine the loss due to integrality restoration of the fractional allocations, as shown in steps 5-13 of Algorithm 1. To determine the loss and implement step 804, the multicast scheduler 304, at step 806, can perform integral channel allocation for each component by successively assigning a channel to a session that yields the largest flow such that a maximum flow limit for any corresponding session is not exceeded. For example, as shown in steps 7-9 of Algorithm 1, a new integral channel allocation $Z_{k,c}$ can be applied for each component c. With $A_k*$ as the maximum flow limit for session k, the multicast scheduler 304 can assign each channel to the session yielding the largest flow based on the remaining flow, as shown in steps 8-11 of Algorithm 1. Then the loss due to integral allocation can be determined with respect to the optimal fractional allocation.

Thus, at step 808, the multicast scheduler 304 can determine, for each component, the loss of flow resulting from the integral channel allocation with respect to the solution of the LP relaxation. For example, as illustrated in step 12 of Algorithm 1, the loss due to integral allocation can be determined with respect to the optimal fractional allocation (step 12).

At step 810, the multicast scheduler 304 can select the component (c') yielding the smallest loss and can implement the integral allocation for the selected component: c'=arg min$_{c \in C}$ L$_c$. In addition, the multicast scheduler 304 can thereafter determine the corresponding integral allocation ($\hat{X}_{k,c'}$), as illustrated in steps 14-17 of Algorithm 1.

At step 812, the multicast scheduler 304 can update the flow for each session based on the existing allocations. For example, as provided in Algorithm 1, the maximum flow limit for each session A$_k$* in the selected component is updated based on the implemented integral channel allocation: A$_k$*=min {A$_k$*, F$_{k,c'}\hat{X}_{k,c'}$}.

At step 814, the multicast scheduler 304 can determine whether channel allocation has been implemented for each component. If not, then the method can proceed to step 804 and can repeat. Otherwise, the method may end. Thus, the procedure is repeated until integral channel allocation is restored to all components.

To illustrate the performance of MSDP, the following lemma and theorem are provided:

Lemma 1:
The optimal solution to the LP relaxation of MDP has atmost min{K, C} sessions with channel allocation.

Theorem 2:
MSDP provides a performance guarantee of $$\max\left\{\frac{1}{2}, \left(1 - \frac{C(C-1)}{2N}\right)\right\}$$

in the worst case, where C and N are the number of components and channels, respectively.

The proofs of Lemma 1 and Theorem 2 have been omitted for brevity purposes.

B. Greedy Method for DP

Figure 9:
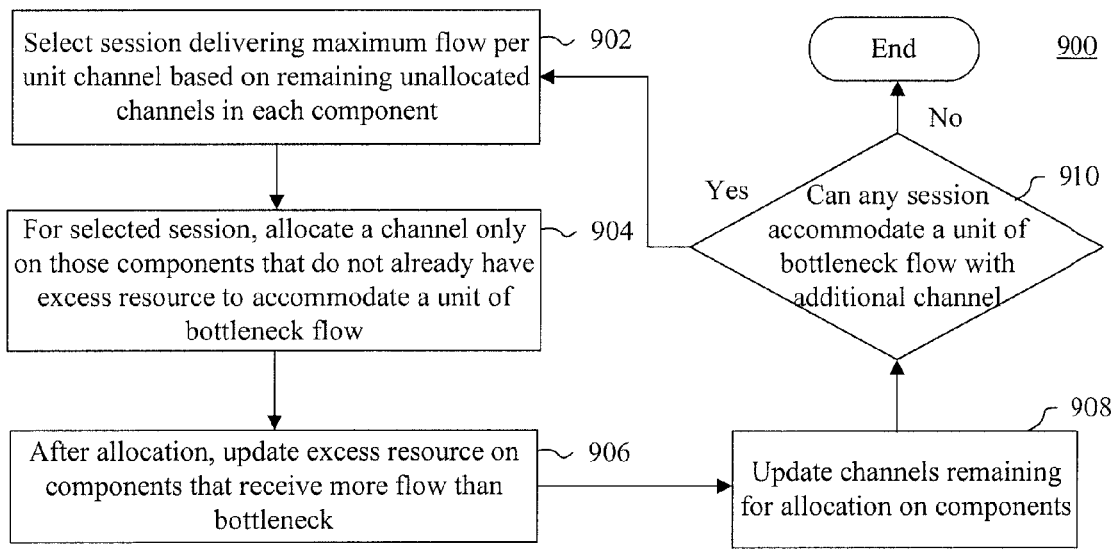
FIG. 9 is a block/flow diagram of a greedy scheduling method.

The DP model is widely preferred by service providers due to its simplicity, albeit both DP and CP models are permissible in the relay standard. Hence, it can be beneficial to employ a fast scheduling algorithm for the DP model that does not utilize the assistance of an LP solver. To this end, with reference to FIG. 9 and continuing reference to FIGS. 3 and 4, a greedy scheduling method 900 is provided. It should be noted that the method 900 can be performed to implement step 404 of the method 400. In addition, it should also be noted that Algorithm 2 in Table 3 below can be performed to implement the method 900. Algorithm 2 is a greedy algorithm (GSDP) whose average case performance is close to that of MSDP described above.

TABLE 3

Algorithm 2 Greedy Scheduler under DP: GSDP

| | |
|---|---|
| 1: | A$_{k,c}$ = 0, E$_{k,c}$ = 0, ∀k, c; valid_ses = 1, K = {1, . . . , K} |
| 2: | $U_{k,c} = \frac{F_k^{min}}{F_{k,c}}$, ∀ k, c, where F$_k^{min}$ = min$_c$ F$_{k,c}$ |
| 3: | Available channels, M$_c$ = N, ∀c |
| 4: | while valid_ses = 1 do |
| 5: | for k ∈ [1, K] do |

TABLE 3-continued

Algorithm 2 Greedy Scheduler under DP: GSDP

| | |
|---|---|
| 6: | S$_{k,c}$ = [U$_{k,c}$ − E$_{k,c}$]$^+$, ∀c, where [x]$^+$ = max{x, 0} |
| 7: | if Π$_c$ (M$_c$ + E$_{k,c}$) == 0 then K ← K\k end |
| 8: | end for |
| 9: | if K ≠ 0 then |
| 10: | $k' = \arg\max_{k \in K} \frac{\min_c \{F_{k,c} M_c\}}{\Sigma_c M_c}$, ∀ c |
| 11: | A$_{k',c}$ = A$_{k',c}$ + 1, if S$_{k',c}$ > 0, ∀c |
| 12: | $E_{k',c} = \frac{A_{k',c} F_{k',c} - \min_c \{A_{k',c} F_{k',c}\}}{F_{k',c}}$, ∀ c |
| 13: | M$_c$ = N − Σ$_k$ A$_{k,c}$, ∀c |
| 14: | else |
| 15: | valid_ses = 0 |
| 16: | end if |
| 17: | end while |

GSDP leverages the following observation pertaining to the structure of the optimal fractional solution: when all N channels are assigned to the session with the highest bottleneck flow (k*=arg max$_k${min$_c$ F$_{k,c}$}), the bottleneck component of k* uses up all N channels, while the remaining components remain underutilized. It should be understood that a "bottleneck flow" for a session is defined herein to be the session's minimum flow among all the relay station subsets that transmit the session's data. To efficiently utilize (pack) N channels on all C components to deliver higher aggregate flow, more sessions (atmost C) should be multiplexed such that their respective bottlenecks occur in different components. Essentially, this permits k* to sacrifice some channels on its bottleneck component, which can then be used by other sessions (with bottlenecks in other components) to deliver (pack) a higher flow per unit channel. GSDP uses this observation to greedily assign channels on a per-session basis across all components.

Further, GSDP maintains and updates two vectors for each session at every iteration: A$_{k,c}$ indicating the (integral) channel allocation for session k on component c, and E$_{k,c}$ indicating the fraction of an allocated channel on component c that is in excess of what is needed to support the current allocated flow (min$_c$ {A$_{k,c}$F$_{k,c}$}). GSDP increments the flow assigned to a session by a unit of the bottleneck flow. Because channels can only be allocated integrally, this causes components other than the bottleneck of the session to be assigned excess flow.

The method 900 can begin at step 902, in which the multicast scheduler 304 can select the session that delivers the maximum flow per unit channel when all the remaining channels in each component (M$_c$) are taken into account, for example, as shown in step 10 of GSDP:

$$k' = \arg\max_{k \in K} \frac{\min_c \{F_{k,c} M_c\}}{\sum_c M_c}, \forall c.$$

The selection step 902 can be performed at every iteration of the method 900. Sessions that do not have any resource remaining on any component (M$_c$+E$_c$=0) are not considered in the selection, for example, as provided in step 7 of GSDP.

At step 904, the multicast scheduler 304 can allocate a channel to the selected session. Here, the channel is allocated to the session that yields the largest bottleneck flow in subsets in which the session lacks resources that are in fractional excess with respect to a unit of the corresponding bottleneck flow. For example, as provided in steps 6 and 11 of GSDP, a channel is allocated to the selected session only on those components that do not already have excess channel resource $S_{k,c}$ to accommodate a unit of the bottleneck flow $U_{k,c}$.

At step 906, the multicast scheduler 304, for components that receive more flow than the bottleneck, can update the excess resource available for the session on the respective component, for example, as illustrated in step 12 of GSDP:

$$E_{k',c} = \frac{A_{k',c}F_{k',c} - \min_c\{A_{k',c}F_{k',c}\}}{F_{k',c}}, \forall c.$$

Here, the variable $E_{k',c}$ can correspond to a fractional excess with respect to a corresponding bottleneck flow for session k' and component c due to integral channel allocation. The multicast scheduler 304 can then use excess flow for subsequent allocations.

At step 908, the multicast scheduler 304 can update the channels remaining for allocation on each component, for example, as illustrated in step 13 of GSDP: $M_c=N-\Sigma_k A_{k,c}$, $\forall c$. The update here can occur after every iteration of the method 900.

At step 910, the multicast scheduler 304 can determine whether any session can accommodate a unit of bottleneck flow with an additionally allocated channel. The method 900 can terminate when no session has any remaining resource to accommodate a unit of its bottleneck flow (K≠0, step 15 of GSDP). Otherwise, the method can proceed to step 902 and can be repeated until no session has any remaining resource to accommodate a unit of its bottleneck flow.

Multicast Scheduling Under CP

Unlike the distributed permutation model, in contiguous permutation, channels of a session experience different rates both within and across components. The scheduling problem can be formulated as the following integer program (MCP).

$$MCP: \text{Maximize} \sum_{k=1}^{K} A_k$$

$$\text{subject to, } \sum_{i=1}^{N} F_{k,c,i}X_{k,c,i} \geq A_k, \forall k, c$$

$$\text{where, } F_{k,c,i} = w_k r_{k,i}(c);$$

$$X_{k,c,i} \in \{0, 1\}$$

Here, N is the total number of channels; $X_{k,c,i}$ indicates if channel i is allocated to session k in component c, where $X_{k,c,i}=1$ if channel i is allocated to session k in component c and $X_{k,c,i}=0$ otherwise; $F_{k,c,i}$ is the weighted flow for session k in component c on channel i and depends on the weight for the session $w_k$ and its rate $r_{k,i}(c)$ in component c on channel i.

MCP is similar to MDP except that session rates $F_{k,c,i}$ are now a function of the channel as well. LP-based algorithms (MSCP) that extend MSDP for the CP model can be employed to solve MCP.

A. Low-Complexity Method

Figure 10:
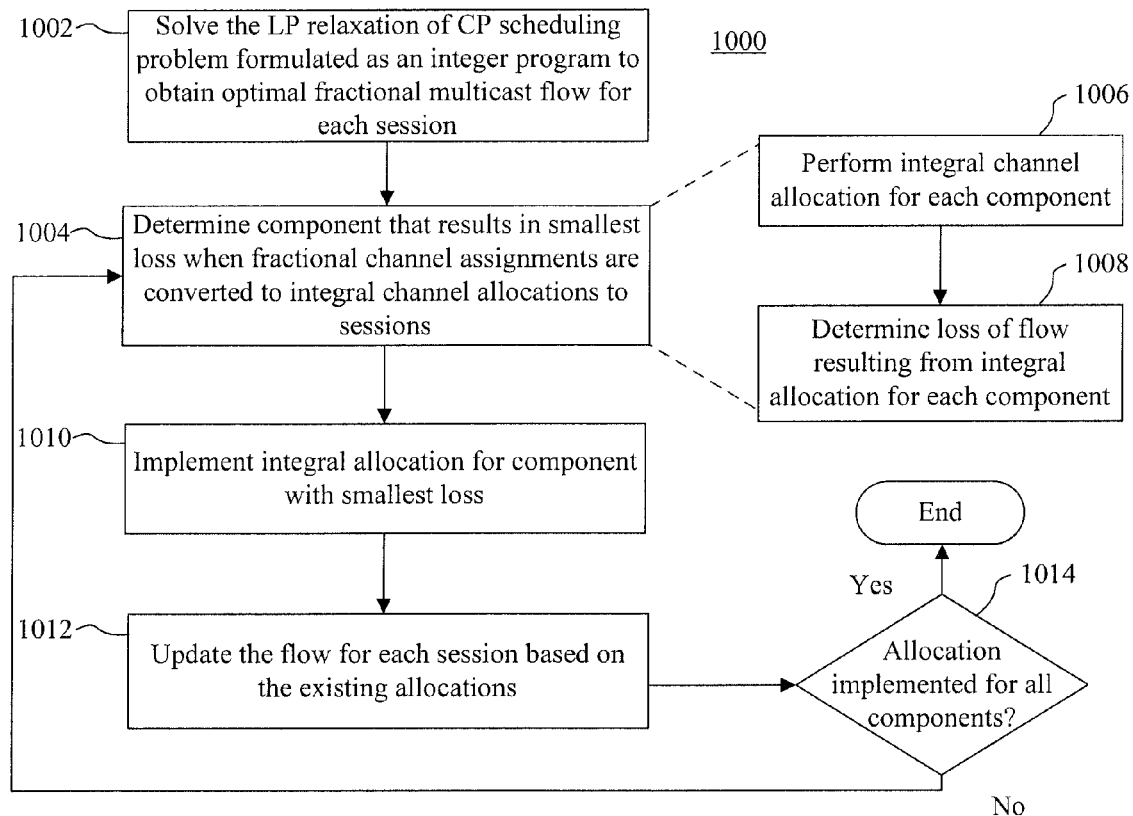
FIG. 10 is a block/flow diagram of a scheduling method based on a contiguous permutation model.

With reference now to FIG. 10 with continuing reference to FIGS. 3, 4 and 8, a method 1000 for determining a multicast schedule in accordance with an exemplary embodiment of the present invention is illustrated. It should be noted that the method 1000 can be performed to implement step 404 of the method 400. In addition, it should also be noted that Algorithm 3 in Table 4 can be performed to implement the method 1000. Algorithm 3 is an LP-based algorithm (MSCP1) that can be utilized to solve MCP.

TABLE 4

Algorithm 3 Multicast Scheduler under CP: MSCP1

1: Solve the LP relaxation of MCP ($X_{k,c,i} \in [0,1]$) with solution $X_{k,c,i}^*$ and $A_k^*$.
2: C = {1,...,C}
3: while C ≠ 0 do
4:   Determine the loss due to integrality restoration in each component.
5:   for c ∈ C do
6:     $Z_{k,c,i} = 0$, $\forall k,i$, $B_k = A_k^*$, $\forall k$; I = {1,...,N}.
7:     while I ≠ 0 do
8:       (k',i') = arg $\max_{k,i \in I}$ {min{$F_{k,c,i}$,$B_k$}}
9:       $Z_{k',c,i'} = 1$
10:      $B_{k'} = B_{k'} - \min\{F_{k',c,i'},B_{k'}\}$; I ← I \ i'
11:    end for
12:    $L_c = \Sigma_k \{A_k^* - \Sigma_i Z_{k,c,i}\} \cdot F_{k,c,i}$
13:  end for
14:  Perform integral allocation for component with smallest loss
15:  c' = arg $\min_{c \in C} L_c$
16:  Update $\hat{X}_{k,c',i} \leftarrow Z_{k,c',i}$, $\forall k,i$
17:  Update $A_k^* = \min\{A_k^*, \Sigma_i F_{k,c',i}\hat{X}_{k,c',i}\}$, C ← C \ c'
18: end while The method 1000 and MSCP1 follows an approach that is similar to that applied in the method 800 and MSDP, respectively. The fractional solution from solving the LP relaxation of MCP can be used as the starting point and integrality can be restored in each component sequentially. However, varying rates across channels ($F_{c,k,i}$) are now taken into account, which involves restoring integrality on a per-channel basis) ($\hat{X}_{k,c,i}$). Also, the integrality restoration algorithm is different, as shown in steps 7-11 and discussed in more detail below.

The method 1000 can begin at step 1002 in which the multicast scheduler 304 can solve the LP relaxation of MCP as illustrated in step 1 of MSCP1. Let the solution of the LP relaxation be $X_{k,c,i}^*$ and $A_k^*$ with net optimal flow being $\Sigma_k A_k^*$. As stated above, $X_{k,c,i}$ indicates if channel i is allocated to session k in component c, with $X_{k,c,i} \in \{0,1\}$. Similar to MSDP, some of the channels may be fractionally shared between sessions in each component and are integrally restored on a per-channel basis, as stated above.

At step 1004, the multicast scheduler 304 can determine the component that results in smallest loss when fractional channel assignments are converted to integral channel allocations to sessions. For each component c, the multicast scheduler 304 can determine the loss due to integrality restoration of the fractional allocations, as shown in steps 5-12 of Algorithm 3. To determine the loss and implement step 1004, the multicast scheduler 304, at step 1006, can perform integral channel allocation for each component by successively selecting a session and channel pair, for assignment in the component, that yields the largest flow such that a maximum flow limit for any corresponding session is not exceeded. For example, as shown in MSCP1, at each iteration, the session-channel (k', i') pair that provides the maximum flow is jointly chosen and channel i' is allocated to session k' (step 8 of MSCP1), while taking into account the maximum flow limit $A_k^*$, for session k', which is tracked by the flow $B_{k'}$, returned after integral allocation from the previous component (step 10 of MSCP1). After all channels are integrally assigned, similar to MSDP, the loss due to integral allocation can be determined with respect to the optimal fractional allocation in the component.

Thus, at step 1008, the multicast scheduler 304 can determine, for each component, the loss of flow resulting from the integral channel allocation with respect to the solution of the LP relaxation. For example, as illustrated in step 12 of MSCP1, the loss due to integral allocation can be determined with respect to the optimal fractional allocation.

At step 1010, the multicast scheduler 304 can select the component yielding the smallest loss (c') and can implement the integral allocation for the selected component: c'=arg $\min_{c \in C} L_c$. For example, the multicast scheduler 304 can determine the corresponding integral allocation ($\hat{X}_{k,c',i}$), as illustrated in steps 14-16 of Algorithm 3.

At step 1012, the multicast scheduler 304 can update the flow for each session based on the existing allocations. For example, as illustrated in Algorithm 3, the maximum flow limit for each session $A_k^*$ in the selected component is updated based on the implemented integral channel allocation: $A_k^* = \min \{A_k^*, \Sigma_i F_{k,c',i} \hat{X}_{k,c',i}\}$.

At step 1014, the multicast scheduler 304 can determine whether channel allocation has been implemented for each component. If not, then the method can proceed to step 1004 and can repeat. Otherwise, the method may end. Thus, the procedure is repeated until integral channel allocation is restored to all components.

With regard to MSCP1, the following theorem is noted:
Theorem 3:
MSCP1 provides a performance guarantee of $$\left(\frac{1}{2}\right)^C.$$

The proof has been omitted for brevity purposes. It should also be noted that C is typically a small number (C=2 being the dominant case), which makes the guarantee of ¼ attractive even for the harder CP model.

B. High-Complexity Method

In accordance with other exemplary aspects, the performance guarantee can be further improved by replacing the greedy solution for integrality restoration inside each component provided above with respect to MSCP1 with a more sophisticated LP-based scheme that solves a variant of the maximum general assignment problem. Each single component (c) problem can be formulated as the following integer program (IPc)

$$IPc: \text{Maximize} \sum_s F_{k,c}^s X_{k,c,s}$$

$$\text{subject to,} \sum_{k,s \in S_k : i \in s} X_{k,c,s} \leq 1, \forall i \in [1, N]$$

$$\sum_{s \in S_k} X_{k,c,s} \leq 1, \forall k$$

$$F_{k,c}^s = \sum_{i \in s} F_{k,c,i}^s; X_{k,c,s} \in \{0, 1\}$$

Here, channel allocation to a session is made in subsets of channels, where each subset s∈ $S_k$ indicates a feasible set of channels that can be assigned to session K. Feasibility here refers to the maximum flow constraint, where $\Sigma_{i \in s} F_{k,c,i} \leq A_k^*$. Hence, given a subset, one can modify the flow rates into $F_{k,c,i}^s$ such that $\Sigma_{i \in s} F_{k,c,i} = \min \{\Sigma_{i \in s} F_{k,c,i}, A_k^*\}$. Because IPc is a hard integer program, LP-relaxation is employed to solve the problem. However, there are an exponential number of variables due to $S_k$, which entails the use of iterative primal-dual or Lagrangian based LP techniques. When converted to the dual domain, the exponentially many variables translates to exponentially many constraints. Interestingly, the separation oracle for the constraints is a simple single knapsack problem, which can be solved efficiently to within (1−ϵ). This permits the dual and consequently the primal (LP-relaxation to IPc) to also be solved within (1−ϵ) of the optimal.

Figure 11:
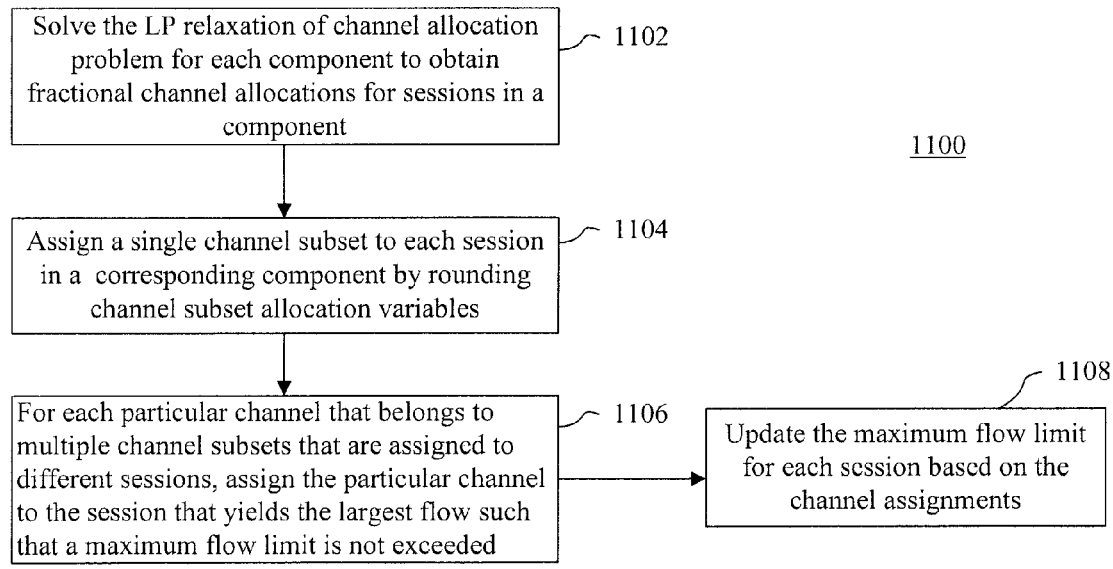
FIG. 11 is a block/flow diagram of a method for integral restoration of fractional channel allocations.

Referring now to FIG. 11 with continuing reference to FIGS. 3 and 10, an alternative method 1100 for performing the integral channel allocation step 1006 in the method 1000 in accordance with an exemplary embodiment is illustrated. The method 1100 permits the generation of a feasible multicast schedule with integral channel allocations to sessions. It should be noted that Algorithm 4 (MSCP2) in Table 5, described in more detail below, can be performed to implement the method 1100. It should also be noted that the MSCP2 first solves the LP relaxation of MCP in the same manner discussed above with respect to step 1002 in the method 1000, as shown at step 1 of Algorithm 4.

TABLE 5

Algorithm 4 Multicast Scheduler under CP: MSCP2

1: Solve the LP relaxation of MDP ($X_{k,c,i} \in [0,1]$) with solution $X_{k,c,i}^*$ and $A_k^*$.
2:    for c ∈ [1, C] do
3:    Formulate IPc and solve its LP relaxation with output $X_{k,c,s}^*$
4:    Round $X_{k,c,s_k} = 1$ with probability $X_{k,c,s}^*$; $X_{k,c,s} = 0$, $\forall s \neq s_k$, $\forall k$
5:    Assign channel i to k' = arg $\max_{k:i \in s_k}\{F_{k,c,s_k}\}$; remove i from $s_k \neq s_{k'}$; $\forall i \in [1,N]$
6:    Update $A_k^* = \min\{A_k^*, \Sigma_{i \in sk} F_{k,c,i}^{s_k}\}$, $\forall k$
7: end for To implement the channel allocation at step 1006, the method 1100 can begin at step 1102 in which the multicast scheduler 304 can, for each component, solve the LP relaxation of a channel allocation problem that is formulated to maximize a flow for a given session in a corresponding component to obtain a fractional channel allocation of at least one channel subset to the given session in the corresponding component. For example, as illustrated in step 3 in Algorithm 4, IPc can be formulated and LP relaxation for IPc can be solved to output $X_{k,c,s}^*$ for each session and component. As indicated above, $X_{k,c,s}^*$ initially allocates channel subset s to session k of component c. The multicast scheduler 304 can solve the LP relaxation of IPc for each component sequentially.

At step 1104, the multicast scheduler 304 can assign a particular channel subset, obtained from the fractional channel allocation in step 1002, to each session in the corresponding component. For example, the LP relaxation solution may assign multiple subsets (fractionally) to a session and a channel may be assigned to multiple sessions. As shown in step 4 of Algorithm 4, the multicast scheduler 304 can address this by first rounding the subset assignment variables $X_{k,c,s_k}$ for each session such that only a single subset $s_k$ is assigned to k, where $s_k=s$ happens with probability $X_{k,c,s}^*$.

At step 1106, the multicast scheduler 304 can, for each particular channel that belongs to multiple channel subsets that are assigned to different sessions, assign the particular channel to the session that yields the largest flow with the given channel such that a maximum flow limit for any corresponding session is not exceeded. For example, because a channel (i) may still be assigned to multiple sessions, as shown in step 5 of Algorithm 4, the multicast scheduler 304 can assign the channel to the session delivering the highest flow ($\max\{F_{k,c,i}^{s_k}\}$) and can remove the channel from the other sessions. Furthermore, as shown in step 6 of Algorithm 4, the flow ($\Sigma_{i \in s_k} F_{k,c,i}^{s_k}$) resulting from the integral allocation to each session k in a given component c is used to bound the maximum flow for the session in the next component.

Thus, at step 1108, the multicast scheduler 304 can update the maximum flow limit for each session based on the given channel assignments. For example, as stated above and shown in step 6 of Algorithm 4, $A_k^*$ can be updated using the flow $A_k^* = \min\{A_k^*, \Sigma_{i \in s_k} F_{k,c,i}^{s_k}\}$, $\forall k$ resulting from the integral allocation to each session k in a given component c.

Returning to method 1000, after the integral channel allocations $X_{k,c,s_k}$ are obtained in accordance with method 1100 at step 1006, the method 1000 may proceed to step 1008 and may be executed as described above with respect to the low complexity method for solving MCP. However, here, the multicast scheduler 304 can convert the integral channel allocations $X_{k,c,s_k}$ to $Z_{k,c,i}$ to obtain the loss of flow resulting from integral channel allocation for each component, as shown in step 12 of Algorithm 3. It should be noted that $A_k^*$ in step 12 of Algorithm 3 corresponds to the solution obtained from LP relaxation of MCP. The method 1000 may thereafter be performed as described above with respect to the low complexity method for solving MCP.

The following theorem with regard to the performance guarantee of MSCP2 is noted:

Theorem 4:

MSCP2 has a worst case performance guarantee of $$\left(1 - \frac{1}{e} - \varepsilon\right)^c.$$

The proof has been omitted for brevity purposes.

C. Greedy Method for CP

In accordance with exemplary embodiments, a greedy method can be employed to solve MCP. With reference again to FIG. 9 and continuing reference to FIGS. 3 and 4, the greedy scheduling method 900 described above for the DP model can be applied to solve MCP in a similar manner. However, as mentioned above, CP differs from DP in that session rates $F_{k,c,i}$ are now a function of the channel i. Thus, the multicast scheduler 304 can perform the method 900 in the same manner discussed above, except that the multicast scheduler 304 selects a channel having the highest gain among the unallocated channels ($M_c$) in the corresponding component for allocation to the session k' at step 904. As stated above, a channel is allocated to the session k' only on those components that do not already have excess channel resource $S_{k',c}$ to accommodate a unit of the bottleneck flow $U_{k',c}$.

It should be noted that the optimal multicast strategy provided above involves solving the general C component problem. However, the case with C=2 carries practical importance in the standards (WiMAX), mostly owing to its easier realization. For C=2, which also corresponds to the pure cooperation strategy, multicast scheduling algorithms described above provide good guarantees of $$\left(1 - \frac{1}{N}\right)$$

for the DP model, and ¼ and $$\left(1 - \frac{1}{e}\right)^2$$

for the CP model. Similarly, for the pure reuse strategy, the algorithms work with C=R+1 components and the corresponding guarantees would apply. Thus, solving the generic C component problem assists in obtaining efficient scheduling algorithms for both cooperation and reuse, either through isolated or joint strategies.

As stated above, backlogged buffers have been considered in the formulations employed herein. However, the formulations easily extend to incorporate finite data buffers for sessions by the addition of K flow constraints, while the methods and the algorithms and their guarantees would continue to apply.

Further, the conventional relay unicast scheduling problem can be captured as a special case of the multicast problem with C=2, where there is no channel reuse across relays in the access hop. This provides unicast scheduling algorithms with guarantees of $$\left(1 - \frac{1}{N}\right) \text{ and } \left(1 - \frac{1}{e}\right)^2$$

for the DP and CP models respectively.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for transmitting multicast data on a wireless relay network comprising:

associating relay stations into different subsets such that relay stations within a subset employ a cooperation mechanism to transmit multicast data on common transmission resources and employ a resource reuse mechanism to transmit the multicast data independently with respect to relay stations in other subsets;

determining a schedule to allocate transmission resources to each subset and thereby implement the cooperation and resource reuse mechanisms; and transmitting the multicast data to users in accordance with the schedule;

wherein the determining a schedule further comprises solving a scheduling problem formulated to maximize an aggregate flow for a plurality of multicast sessions wherein the determining a schedule further comprises solving the linear program (LP) relaxation of the scheduling problem in accordance with a contiguous permutation model to obtain a fractional channel allocation to each session of each subset;

wherein the determining a schedule further comprises performing integral channel allocation for each subset;

determining, for each subset, the loss of flow resulting from the integral channel allocation with respect to the solution of the LP relaxation;

selecting and implementing the integral channel allocation for the subset yielding the lowest loss of flow; and updating the maximum flow limit for each session of the selected subset based on the implemented integral channel allocation.

2. The method of claim 1, wherein the associating further comprises determining, at each given relay station, a set of neighboring relay stations that cause interference exceeding a threshold for users served by the given relay station.

3. The method of claim 2, wherein the associating further comprises transmitting training symbols from each relay station and receiving interference power measurements from users served by the given relay station to determine whether the interference exceeds the threshold.

4. The method of claim 3, wherein the associating further comprises selecting relay stations for inclusion into subsets by representing relay stations as vertices in a graph, linking relay stations with corresponding neighboring relay stations causing interference exceeding the threshold and defining subsets as disjoint components of the graph.

5. The method of claim 1, wherein the performing channel allocation for each subset further comprises successively selecting a session and channel pair, for assignment in the subset, that yields the largest flow such that a maximum flow limit for any corresponding session is not exceeded.

6. The method of claim 1, wherein the subsets are relay station subsets and wherein the performing channel allocation for each relay station subset further comprises:

solving the LP relaxation of a channel allocation problem, for each relay station subset, that is formulated to maximize a flow for a given session in a corresponding relay station subset to obtain a fractional channel allocation of at least one channel subset to the given session in the corresponding relay station subset;

assigning a particular channel subset, obtained from the fractional channel allocation of at least one channel subset, to each session in the corresponding relay station subset;

for each particular channel that belongs to multiple channel subsets that are assigned to different sessions, assign the particular channel to the session that yields the largest flow with the particular channel such that a maximum flow limit for any corresponding session is not exceeded; and updating the maximum flow limit for each session based on the particular channel assignments.

7. The method of claim 1, wherein the performing integral channel allocation, the determining the loss of flow, the selecting and implementing the integral channel allocation and the updating are repeated until integral channel allocations for all subsets are implemented.

8. A wireless relay network system comprising:

a set of relay stations that are associated into different subsets such that relay stations within a subset employ a cooperation mechanism to transmit multicast data on common transmission resources and employ a resource reuse mechanism to transmit the multicast data independently with respect to relay stations in other subsets; and a base station configured to determine a schedule to allocate transmission resources to each subset and thereby implement the cooperation and resource reuse mechanisms, wherein the relay stations are configured to relay multicast data for transmission to a plurality of users in accordance with the schedule;

wherein the base station is further configured to determine the schedule by solving a scheduling problem formulated to maximize an aggregate flow for a plurality of multicast sessions;

wherein the scheduling problem is based on a distributed permutation model and wherein the base station is further configured to determine the schedule by solving the linear program (LP) relaxation of the problem to obtain a fractional channel allocation to each session of each subset;

wherein the base station is further configured to determine the schedule by:

performing integral channel allocation for each subset by successively assigning a channel to a session, in the subset, that yields the largest flow such that a maximum flow limit for any corresponding session is not exceeded;

determining, for each subset, the loss of flow resulting from the integral channel allocation with respect to the solution of the LP relaxation;

selecting and implementing the integral channel allocation for the subset yielding the lowest loss of flow; and updating the maximum flow limit for each session of the selected subset based on the implemented integral channel allocation.

9. The system of claim 8, wherein the base station is further configured to perform the integral channel allocation, determine the loss of flow, select and implement the integral channel allocation and update the maximum flow limit repeatedly until integral channel allocations for all subsets are implemented.

10. The system of claim 8, the base station is further configured to determine the schedule by allocating a channel to a session that yields the largest bottleneck flow among the subsets.

11. The system of claim 10, wherein the base station is further configured to determine the schedule by allocating the channel to a session that yields the largest bottleneck flow in subsets in which the session lacks resources that are in fractional excess with respect to a unit of the corresponding bottleneck flow.

12. The system of claim 11, wherein the scheduling problem is based on a contiguous permutation model and the base station is further configured to determine the schedule by selecting a channel having the highest gain among unallocated channels in a corresponding subset as the allocated channel.

13. The system of claim 10, wherein the base station is further configured to determine the schedule by updating a first variable denoting any resources that are in fractional excess with respect to a corresponding bottleneck flow for the corresponding session and subset to which a channel is allocated and updating a second variable denoting channels that are available for allocation.

14. The system of claim 13, wherein the base station is further configured to determine the schedule by successively and repeatedly allocating a channel and updating the variables until no session on any subset can accommodate a unit of a corresponding bottleneck flow with an additional channel allocation.

* * * * *